United States Patent
Duncan et al.

[11] Patent Number: 5,455,703
[45] Date of Patent: Oct. 3, 1995

[54] FIBER OPTIC TRANSCEIVER WITH INTEGRATED COUPLER

[75] Inventors: Michael P. Duncan, Pulaski; Norris E. Lewis; Michael B. Miller, both of Christiansburg; Robert T. Rogers, Sr., Blacksburg, all of Va.

[73] Assignee: Litton Systems, Inc., Woodland Hills, Calif.

[21] Appl. No.: 141,526

[22] Filed: Oct. 27, 1993

Related U.S. Application Data

[62] Division of Ser. No. 903,278, Jun. 24, 1992, Pat. No. 5,285,512.

[51] Int. Cl.$^6$ .................................................. H04B 10/00
[52] U.S. Cl. .......................... 359/152; 359/154; 359/180; 359/189; 375/219
[58] Field of Search ........................ 359/109, 110, 359/152, 153, 154, 158, 184, 185, 186, 174, 180, 189; 370/114; 371/20.1; 375/7; 340/825.01

[56] References Cited

U.S. PATENT DOCUMENTS

| | | | |
|---|---|---|---|
| 1,683,310 | 9/1924 | Short | 219/600 |
| 1,879,626 | 10/1927 | Mendenhall | 277/14 V |
| 2,096,222 | 10/1937 | Bock | 73/54.35 |
| 2,828,621 | 4/1958 | von Rosenberg | 73/54.32 |
| 3,667,286 | 6/1972 | Kaufman et al. | 73/54.29 |
| 4,554,673 | 11/1985 | Stevens | 395/118 |
| 4,727,592 | 2/1988 | Okada et al. | 455/601 |
| 4,983,010 | 1/1991 | Popp | 350/96.2 |
| 5,039,194 | 8/1991 | Block et al. | 383/88 |
| 5,060,303 | 10/1991 | Wilmoth | 359/152 |
| 5,069,521 | 12/1991 | Hardwick | 359/110 |
| 5,237,441 | 8/1993 | Nhu | 359/152 |

FOREIGN PATENT DOCUMENTS

| | | |
|---|---|---|
| 2531538 | 2/1984 | France . |
| 8600408 | 1/1986 | WIPO . |

*Primary Examiner*—Hezron E. Williams
*Assistant Examiner*—Richard A. Moller
*Attorney, Agent, or Firm*—Gerald L. Lett

[57] ABSTRACT

A hybrid fiber optic transceiver is described which includes a transmitter for converting electrical data signals to corresponding light energy, a receiver for converting optical data signals back to electrical data signals and a clock recovery mechanism to maintain the electrical data signals outputs from the receiver in their proper order. The transceiver includes an optical splitter or coupler that allows light signals to be transmitted and received over a single fiber. The opto-electrical hybrid circuitry of the transceiver and the fiber optic coupler are enclosed in a small light weight package which is hermetically sealed.

5 Claims, 4 Drawing Sheets

FIBER OPTIC TRANSCEIVER WITH INTEGRATED COUPLER

This application is a division of application Ser. No. 903,278, filed Jun. 24, 1992, U.S. Pat. No. 5,285,512.

BACKGROUND OF THE INVENTION

This invention relates to fiber optic communication circuit components, and in particular, a fiber optic communication transceiver.

Fiber optic communication technology has been developing at a rapid pace. It has become apparent that fiber optic transmitters and receivers can be used in a wide variety of physical circuit topologies to improve the performance of existing networks or to create new fiber optic networks. The two major enabling features of fiber optic technology which promote its use in networking applications are its inherent/potential speed and the small size of the optical fiber in relation to metallic or wire media of equivalent bandwidth. As fiber optic networks have evolved, it has become a common practice to construct the network topology using a variety of multi mode coupler known as the star coupler in order to maximize the number of physical connections which may be made within the constraints of an optical power budget.

There are a number of applications wherein fiber optic networks are used, but wherein the number of fibers must be minimized. Examples of these occur in data transmission networks and aircraft, particularly fighter aircraft. Where the minimization of the number of fibers is important, a reflective star network topology is often selected, since it requires only half as many fiber connections to each node as would a transmissive star topology. In such arrangements, however, it is necessary to provide a means of physically connecting both the fiber optic transmitter and the fiber optic receiver to the same fiber. At this stage of the development of fiber optic technology, there are many types of optical couplers which theoretically could be used for such an application. Virtually all of these, however, present a physical size problem. This arises out of the fact that it has been found to be quite necessary to integrate the coupler within a transceiver housing having the fiber optic circuitry. The resulting package has generally been found to be objectionably large.

Assuming that these coupler packaging problems are solved, it is still necessary to develop fiber optic transmitter and receiver circuitry which is capable of satisfying the various requirements of the data network protocol. As a generalization, it can be said that it is necessary to be able to launch as much light as possible and to have as high a sensitivity as possible in order to provide the maximum optical power budget. It has been found that it would be desirable, if possible, to remove the necessity for including sophisticated clock circuity throughout the network and provide a way for retrieving a clock signal from the received data and to be able to lock into the optical signal with a minimum of preamble bits over a very wide optical power range.

SUMMARY OF THE INVENTION

The foregoing and other problems created by the peculiar requirements placed on communication components in a fiber optic network are solved in a novel fiber optic transceiver according to the invention including a transmitter, receiver, clock recovery circuit and an optic coupler within the same hybrid circuit enclosure. Using the principles of the invention, it is possible to produce a fiber optic transceiver capable of operating in a wide variety of environments including military environments.

In accordance with the principles of invention herein, transmitter, receiver and clock recovery circuits are provided which permit the transceiver to operate with extended sensitivity while, at the same time, providing an external clock signal derived from the incoming data. At the same time, it is possible to provide basic built-in-test (BIT) functions with a minimum of additional circuitry and complexity.

A fiber optic coupler which acts as a splitter has been fabricated using a patented molecular bonding process with the result that a very small coupler is produced having a package which lends itself to use in an integrated transceiver arrangement. Novel coupler housing and transceiver package features have been provided to allow hermetic sealing of the entire assembly. Moreover, the packaging techniques provide a circuit volume which has been minimized while using to the maximum the entire dimension of the system package.

DETAILED DESCRIPTION OF A PREFERRED EMBODIMENT

Figure 1B:
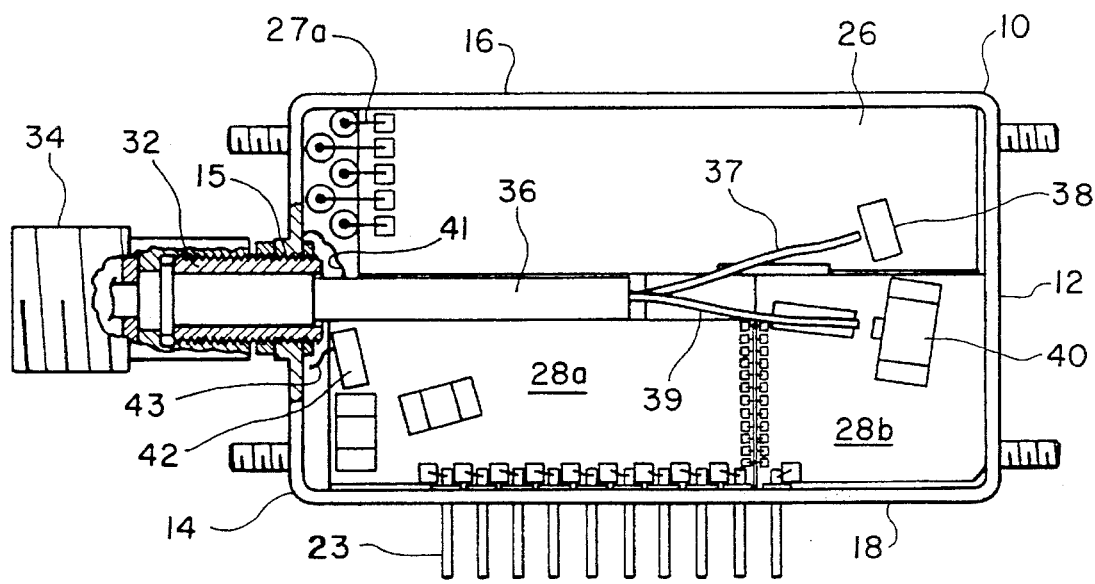
FIG. 1B is a top elevation, partially sectioned view of the FIG. 1A embodiment.
Figure 1A:
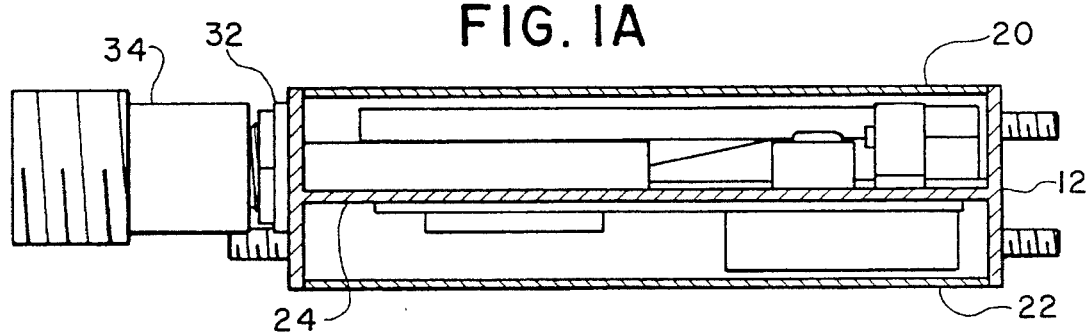
FIG. 1A is a side partial cross sectional view of the fiber optic hybrid transceiver constructed according to the principles of the invention.

FIGS. 1A through 1E illustrate a preferred embodiment of the fiber optic hybrid transceiver constructed according to the invention. Novel packaging concepts had to be developed in order to minimize the size of the overall layout and to maximize the workable volume of the package. In order to provide sufficient surface area for mounting the various circuit substrates, a dual chamber package with a centrally located dividing wall was devised. This allows the transmitter, receiver and clock recovery circuits to be physically separated to prevent electromagnetic interference among these circuits.

This arrangement is best shown in FIGS. 1A through 1E wherein like elements are referred to by like reference numerals. In these figures, the transceiver is contained in a sealed case 10 formed by a right end wall 12, a left end wall 14, side walls 16 and 18, a top wall 20 and a bottom wall 22.

The interior of case 10 is divided vertically by a laterally extending center wall 24 forming top and bottom chambers therein. The top half of the package carries the receiver circuit 26 and transmitter circuits 28a and 28b. The bottom chamber carries a clock recovery circuit 30.

The wall 14 of case 10 is threaded at the opening 15 where the optical fiber is to extend from the case within the coupler assembly 36 to be described in FIG. 2 below. A threaded tube 32 extends through opening 15 for receiving the coupler assembly and for carrying, if desired, a connector 34 for securing a connection to fiber optic cable or data bus extending to the rest of the system.

Referring to FIG. 1B, it will be seen that extending from coupler assembly 36 is an optical fiber 37 connecting the coupler to a photo diode or other photo responsive means 38. Fiber 39 extending from coupler 36 connects it to a light source, such as LED 40. A second light source or BIT LED 42 is provided and mounted on transmitter circuit substrate 28a.

The positions of light source 40 and photo detector 38 are determined by the coupler configuration. These active devices were placed as near as possible to the center line of coupler assembly 36 and as far back as possible in the package. This minimizes the angular separation between fibers 37 and 39 resulting in minimized stress and fiber breaks. Vertical positioning of the components was carefully fixed to minimize stress on the fibers while maintaining the package height at a minimum. Due to the intervening coupler housing 36, and the need to electromagnetically shield the receiver from the other circuit elements, the receiver circuitry 26 and transmitter circuits 28a and 28b could not be fabricated on the same substrate. Since the transmitter circuitry requires more circuit area, the main light source 40 was placed on substrate 28b while the BIT LED 42 and the remainder of the transmitter circuit were placed on substrate 28a. This also makes it possible for the substrate 28a to be tailored for desirable mechanical and heat transfer properties. These two circuits can be built and tested separately prior to installation in the final assembly.

The receiver circuit 26 must be shielded from the other circuit components due to its extreme sensitivity. If it proves necessary, it may be placed inside a two piece shield prior to mounting on the opposite side of the top chamber from the transmitter circuitry. Since the receiver circuit 26 must be "pigtailed" (an assembly method to be described below in connection with FIG. 2) an opening must be left in the side of the shield enclosure to allow penetration by the coupler assembly and the BIT LED fibers.

The built in test (BIT) function uses BIT LED 42 to exercise the receiver circuitry without producing any light external to the transceiver. The BIT LED 42 must be pigtailed with a separate fiber 43 which must also be pigtailed to the photo diode in the receiver in a manner not shown. This means, however, that the photo diode must have sufficient active area to intercept light from both the coupler fiber and the BIT LED fiber, although at different times.

The other half of the internal volume of case 10, or the lower chamber, is taken up by clock recovery circuit 30. The signal output from receiver 26 is coupled by connections 27a and 27b where the clock recovery circuit retrieves the clock signal, and in the process reduces pulse width distortion and jitter, extending the sensitivity range of the receiver in a very significant way.

As will be described herein below, a significant aspect of the clock recovery circuit is a resonator 44; it is necessary to package the resonator in its own shielded compartment in order to further minimize any noise leaking into the very sensitive receiver circuitry.

Figure 1C:
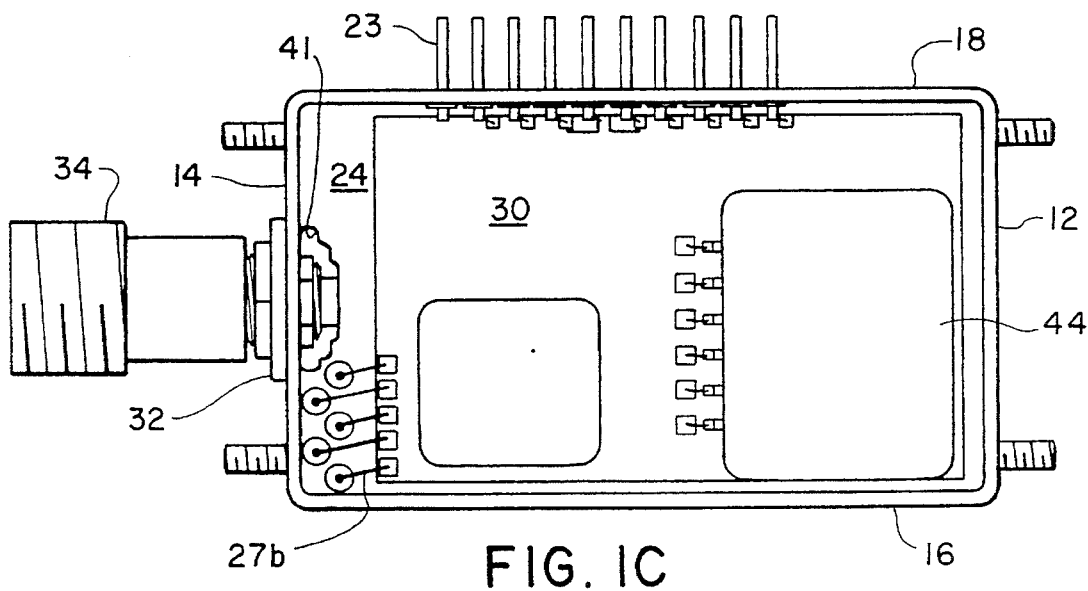
FIG. 1C is a bottom elevation partially sectioned view of FIG. 1A embodiment.
Figure 1D:
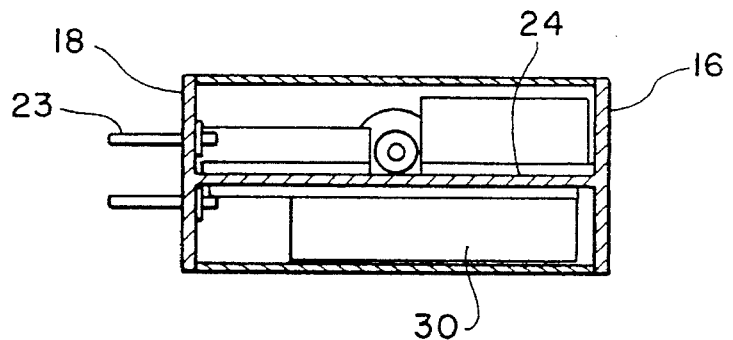
FIG. 1D is a right side elevation, partially sectioned, of the FIG. 1A embodiment.
Figure 1E:
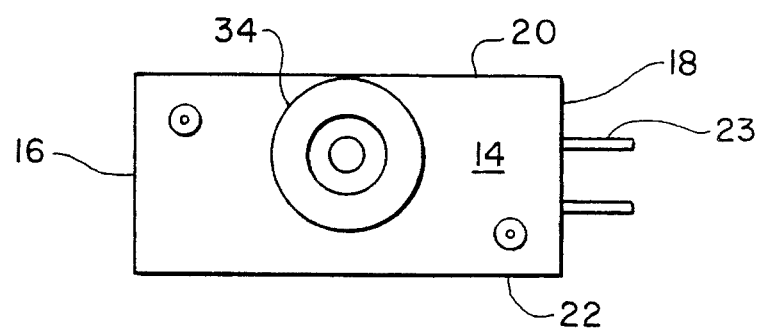
FIG. 1E is a left side elevation of the FIG. 1A embodiment.

FIG. 1C illustrates an opening 41 which had to be formed in central wall 24 to allow access to the coupler assembly for final solder operations. The size of the opening was a compromise which allowed just enough room for soldering without seriously affecting the mechanical stability of central wall 24 or interfering with the electrical feed throughs which link the two chambers within case 10.

Figure 2:
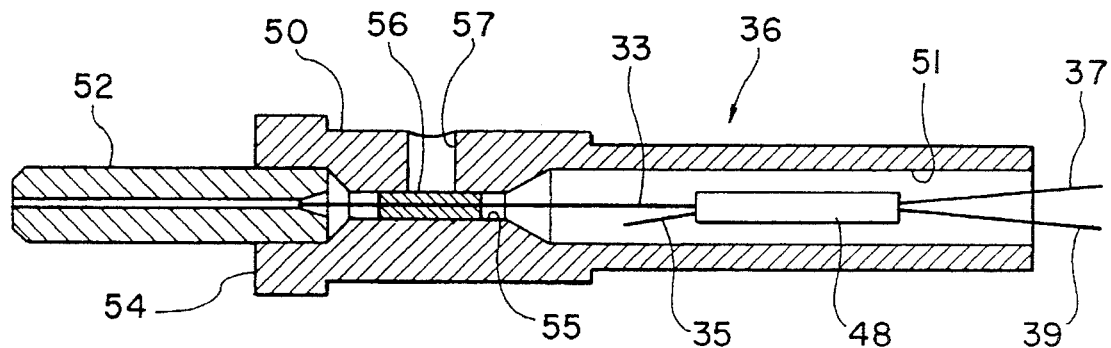
FIG. 2 is a side elevation, partially cross sectioned, of a preferred embodiment of a fiber optic coupler assembly constructed according to the principles of the invention.

FIG. 2 is a side partially cross sectional view of a preferred form of construction of coupler assembly 36. A principal component of the coupler assembly is fiber optic coupler 48 which is fabricated prior to insertion into the assembly using a molecular bonding process described in commonly assigned U.S. Pat. No. 4,738,511. The latter process allows the coupler to be mounted on a substrate which is no more than 0.75" long which would otherwise not be possible if the conventional fused biconic or planer wave guide branching technologies were used to fabricate the coupler. Coupler 48 which functions as a splitter, has a split ratio which can be adjusted to compensate for performance parameters of the transmitter or receiver circuit. For example, the coupler can be fabricated to reduce the output from a very bright light source while at the same time increasing the fraction of light which is channeled to the receiver thereby improving its effective sensitivity. Coupler 48 is fabricated by fusing two fibers together. The ends of those fibers extending from coupler 48 are illustrated by the reference numerals 33, 35, 37 and 39. Fibers 37 and 39 form the connections to the transmitter light source and the receivers photo responsive means. Since reflected technology is being used, only one fiber end 33 need extend through the assembly to the optical data bus. The other fiber end 35 is optically terminated to prevent unwanted reflections.

A coupler tube or ferrule assembly 50 shown in cross section in this FIG. 2 receives coupler 48 in an interior chamber 51, formed as shown. During fabrication of the assembly, the coupler 48 may be inserted through a rear opening 53 of ferrule 50. When so inserted, the coupler 48 is staked with a suitable material such as silicone which will buffer the mechanical and thermal effects on the coupler. As previously indicated, fiber 33 extends from the ferrule assembly 50 to be connected to a portion of the optical data bus via connector 52. In this case, the fiber 33 extends through a narrowed opening 55 through end 54 of the ferrule. As previously discussed, an important aspect of the overall transceiver assembly is that it be hermetically sealed. In order to ensure that ambient air does not enter through coupler assembly 36 opening 55 is sealed by applying the solder 56 through opening 57. Solder is allowed to flow through opening 57 into constricted area 55 and flow around the fiber 33 forming a hermetic seal, In arranging the coupler assembly 36 within the transceiver package, the transmitter and receiver are "pigtailed"; this is a process by which the outer ends of fibers 37 and 39 are placed in proximity to photo detector 38 and LED 40, respectively while light transmission through coupler 48 is monitored. When the fibers are correctly positioned for the desired light transmission characteristics, they are permanently affixed in that position, e.g., with solder or epoxy.

During the "pigtailing" process, the threaded tube 32 of ferrule assembly 50 is rotated so that the coupler assembly moves laterally toward or away from wall 14 which allows the outer ends of fibers 37 and 39 to be moved relative to photodetector 38 and light source 40. This movement of the tube properly positions the fibers to compensate for any variation in component placement. After the coupler assembly is properly positioned and the fibers have been "pigtailed", the case 10 can be sealed. This is accomplished by soldering in three places. The first solder point is at the juncture between tube 32 and ferrule 50; the second is between tube 32 and wall 14 and the third should be at a point where fiber 33 enters ferrule 50. Thus, the coupler assembly becomes part of a hermetically sealed joint in the wall 14 of case 10.

Figure 3:
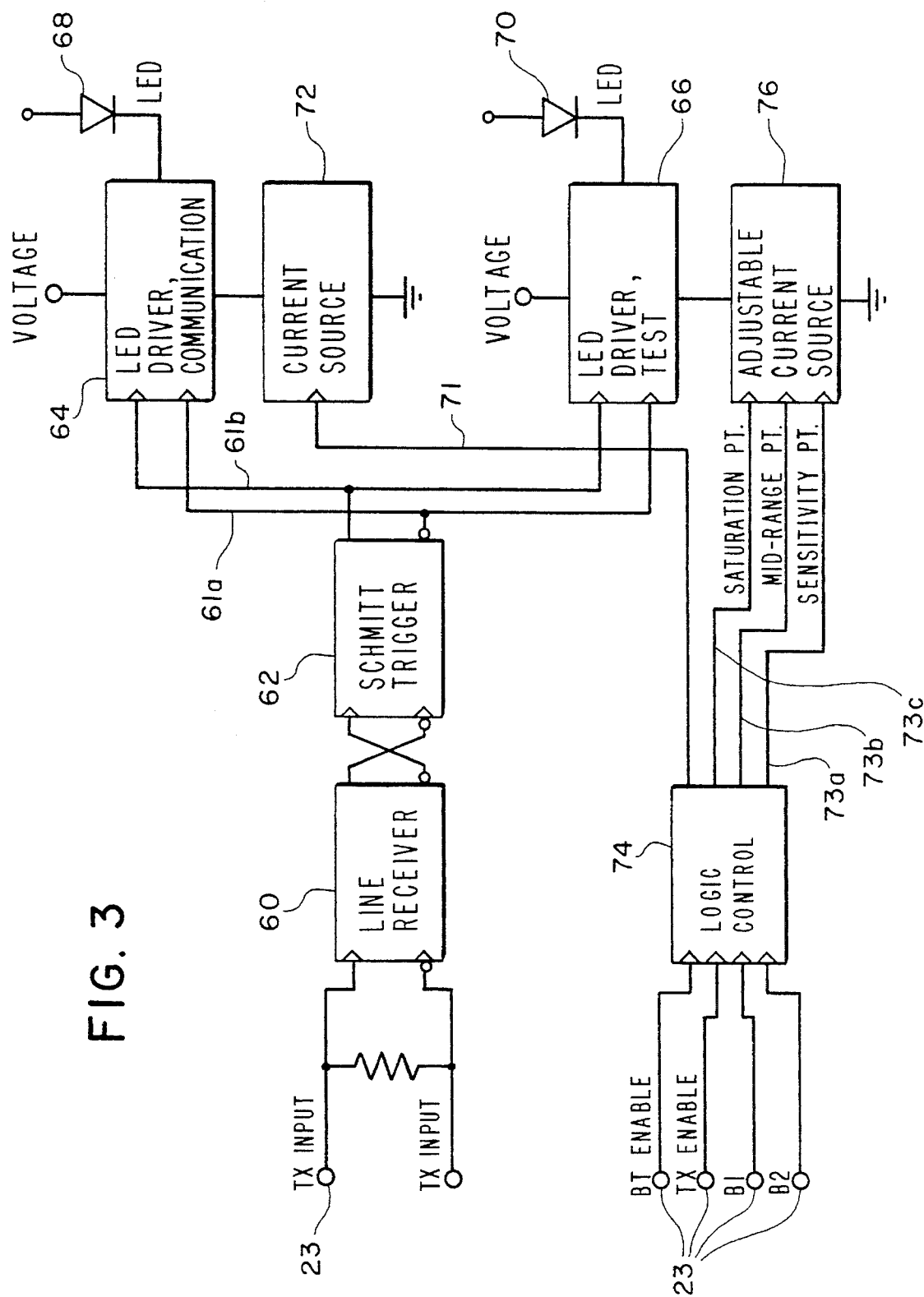
FIG. 3 is a block-schematic diagram of a preferred embodiment of the transmitter circuitry for the transceiver constructed according to the principles of the invention.

FIG. 3 illustrates in block schematic form a preferred embodiment of the transmitter circuit portion 28 of the fiber optic transceiver constructed according to the invention. The terminals 23 shown in FIG. 1 as connected to the transmitter circuit 28 include TX and TX terminals for receiving, for example positive ECL data levels. These are applied to a differential line receiver 60, the outputs of which are connected to a Schmitt trigger circuit 62. The latter circuitry provides proper shaping for the input data in the known manner. By connecting a data output from line receiver 60 to a data-not input of the Schmitt trigger 62 and a data-not output from line receiver 60 to a data input of Schmitt trigger 62 pulse width distortion can be canceled. The output signal from Schmitt trigger 62, via lines 61a and 61b, drives two differential light sources, in this case LED drive circuits 64 and 66. Driver circuit 64 is the communication driver circuit for transmitting signals on the optical data bus through its energization of light emitting diode 40. The power supply for driver circuit 64 is a current source 72 which is operated by an input enable signal via line 71 from logic control circuit 74. When this input enable line is brought low, current source 72 is turned off. The other light source driver 66 operates LED 42 to provide light to the receiver circuit 26 through fiber 43 connected to detector 38 (see FIG. 1B). This test is designed to exercise as much as possible of the transceiver to verify functionality. To accomplish this, an adjustable current source 76 is provided for driver circuit 66. The latter current source can be adjusted for three different current levels, as shown, via lines 73a, 73b and 73c respectively, from logic control 74. These differing current levels can be selected through differing inputs to terminals 23.

When the "BIT enable" and "TX enable" terminals connected to logic control 74 as shown in FIG. 3 are at high and low levels respectively, the transmitter circuit is in the communication mode, and it will supply light from source 68 to the optical data bus. Should it be desirable to remove the transceiver from the communication mode, the "TX enable" terminal can be set to a high level. In order to activate the test mode, a high level signal is applied to the "BIT enable" terminal of the group of terminals 23. This will, of course, have the effect of disabling the transceiver's communication mode. Once the BIT enable terminal is at the high level, higher or lower levels can be applied to terminals B1 and B2 of the group of terminals 23 to adjust the output level of current source 76. This will, in turn, have the effect of adjusting the light level emitted from source 70.

Figure 4:
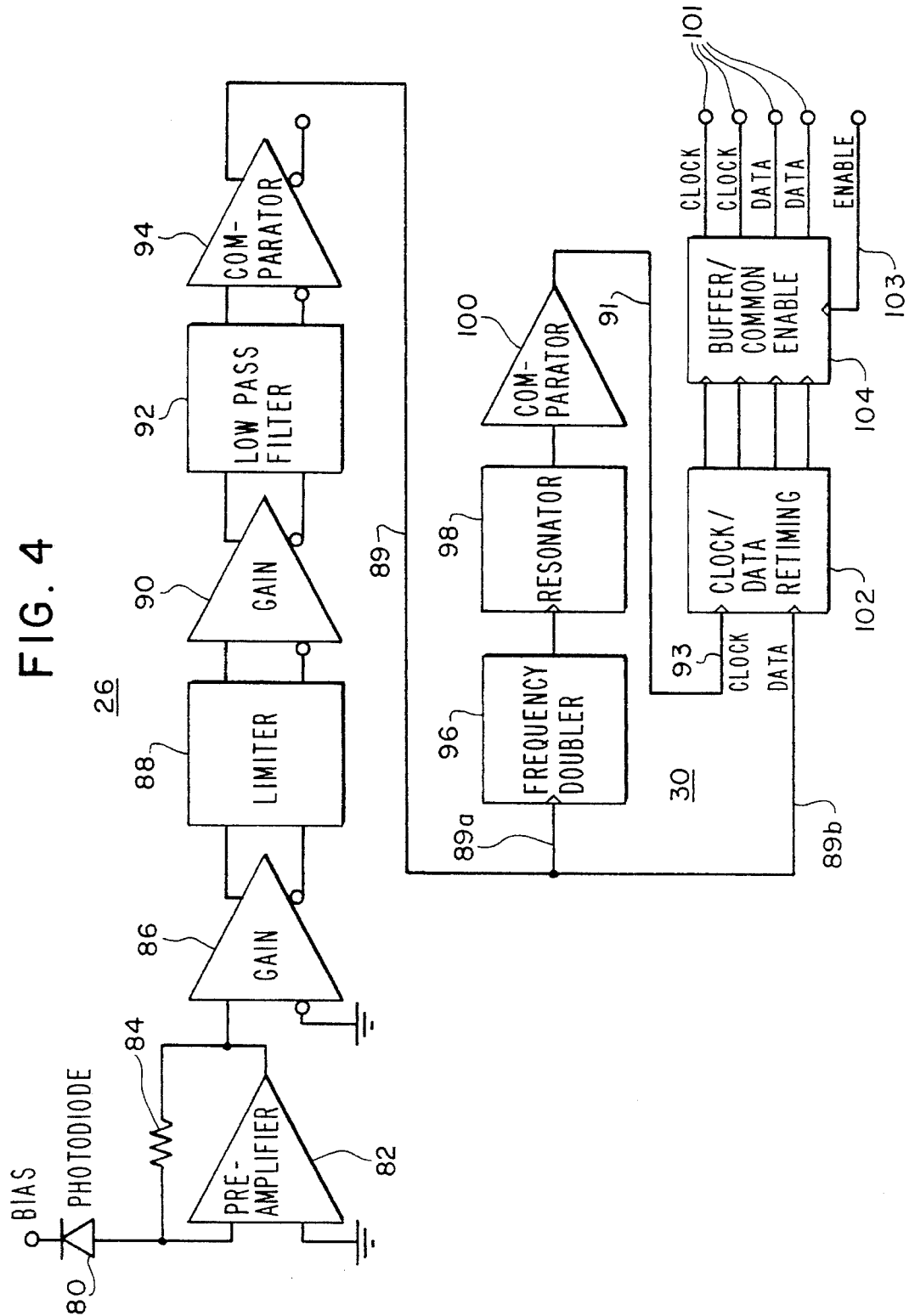
FIG. 4 is a block schematic diagram of a preferred embodiment of the receiver portion of the transceiver constructed according to the principles of the invention including the clock recovery circuit.

FIG. 4 is a block schematic diagram of a preferred embodiment of the receiver circuit 26, as well as clock recovery circuit 30. This receiver circuitry is designed to operate with 20 megabit burst Manchester data, but it can be modified to operate with other data rates. The design is capable of locking on to incoming data in less than 10 preamble bits and successive messages separated by a two microsecond interval over a 25 dB variation in optical input power. The receiver, with the aid of the clock recovery circuit will provide outputs which are retimed Manchester data and a clock which is two times the input clock rate that can be used for decoding the data.

Important characteristics for an optical receiver operating in a local area network environment which are achieved in accordance with this invention are high sensitivity, wide dynamic range and fast acquisition time. The high receiver sensitivity and wide dynamic range are necessary to allow for the maximum number of nodes on the bus. The fast acquisition time is necessary because the transmitting sources are at different distances from the receiver and optical power could vary from minimum to maximum between successive transmissions on the optical bus. The fast acquisition is necessary where the receiver has to respond quickly to an input burst of data. This reduces the length of preamble needed for the receiver to lock on to to allow for increases in data transmission efficiency.

In this preferred embodiment, in order to meet the high sensitivity and wide dynamic range requirements, a silicone photo diode 80 and a transimpedance type preamplifier 82 are used for the optical to electrical conversion. The feedback resistor 84 connecting the output of preamplifier 82 to photo diode 80 is made as large as possible to achieve the necessary sensitivity and dynamic range and to minimize that resistor's contribution to input noise. The value of the feedback resistor, its inherent capacitance, the inherent photo diode capacitance, and the input capacitance of the subsequent amplifier circuitry act together to determine the bandwidth of preamplifier 82. To minimize receiver input noise, the preamplifier bandwidth is set to approximately 70% to 80% of the input bit rate.

The preamplifier stage is followed by two differential amplifier gain sections 86 and 90 separated by a limiter stage 88. The gain of amplifier section 86 is approximately 14 dB at low input signal levels with some limiting action at higher levels. Limiter 88 uses Schottky diodes to clamp the signal amplitude to about 0.4 volts peak to peak in this embodiment. The second gain stage 90 provides an additional 14 dB gain with limiting at high input levels. The foregoing arrangement of amplifier sections and limiter has the effect of compressing a 50 db electrical signal range to an approximately constant amplitude level. Although not shown in detail in the drawings, it is contemplated that capacitor coupling with short time constant will be used between these stages to ensure a fast acquisition time and to eliminate the problems associated with DC drift. The analog output signal which appears at the output of amplifier section 90 is then shaped by a low pass filter 92 to produce a bandwidth at approximately 60% the data bit rate. Using reference comparison techniques, comparator 94 acts to produce an ECL digital logic signal from the shaped analog signal appearing at the outputs of low pass filter 92.

The positive ECL digital logic signal appearing on line 89 at the output of comparator 94 is applied to the two branches 89a and 89b which form the inputs to clock recovery circuit 30. As indicated herein above, the clock recovery circuit has the function of providing a clock signal which has a rate at twice the Manchester data rate. This clock signal is used to retiree the positive ECL data signals appearing on branch 89b.

In the clock recovery circuit, the positive ECL data signals are applied by a branch 89a to a conventional frequency doubler 96. Although not shown, the frequency doubler includes a decision circuit formed by a D type flipflop and provides pulses for each edge of the data signal so that these pulses are at a rate which is two times that of the Manchester data rate at a continuous encoded logic 1 or a logic 0. When the Manchester code switches from an encoded 1 to a 0 or a 0 to a 1, there is a gap where the pulses occur at one-half the rate.

The pulses from frequency doubler 96 are applied to a resonator circuit 98 which may be of any conventional form designed to produce an exponentially decaying sine wave at the center frequency when excited by a pulse. These wave forms appearing at the output resonator 98 are coupled to another reference level comparator circuit 100 which acts to limit these signals to predetermined logic levels. Thus, there appears on line 91 a continuous clock signal that is applied to clock input 93 of a decision circuit 102. The latter circuit 102 operates in the known manner to utilize the clock signal to time the data pulses appearing on line 89b, and the clock and data outputs from circuit 102 are applied to a conventional buffer 104 which is operated by a common enable terminal 103. The latter terminals are connected to other electrical circuitry operating with the fiber optic transceiver of the invention.

The principles of the invention are described hereinabove by describing the construction and operation of a preferred embodiment. It is to be remembered that this exemplary embodiment can be modified or changed without departing from the spirit or scope of the invention as defined by the following claims.

We claim:

1. A hybrid optic transceiver, comprising:
   a. optical receiver means for receiving optical data signals via an optical data bus external to and communicating with said transceiver and for converting the received optical data signals to electrical data output signals and
   b. optical transmitter means for receiving electrical data input signals for converting the electrical data input signals to optical data output signals to be communicated via said optical data bus, said transmitter means comprising:
      terminal means for receiving said multilevel electrical data input signals and having outputs producing therefrom at least data and data-not logic levels,
      pulse shaping means having a data input connected to a data-not output of said terminal means and a data-not input connected to a data output of said terminal means,
      a first light source optically coupled to said optical data bus, first driver means for electrically energizing said first light source, said first driver means being electrically connected to an output of said pulse shaping means so that said first driver means is selectively actuated upon the occurrence of pre-determined levels of output from said pulse shaping means and
      logic control means for selectively activating said first light source driver means when it is desired for said transmitter means to be in a communications mode.

2. The fiber optic transceiver described in claim 1 wherein said optical transmitter means further comprises a built in test optical circuit including a second light source optically coupled to said optical receiver means, second light source driver means for electrically actuating said second light source, said logic control means further including means for selectively actuating said second light source driver means to operate said second light source to provide light outputs of selectively varying intensity to test the operation of said optical receiver means.

3. The hybrid optic transceiver described in claim 1 further comprising an enclosure means for fully enclosing said optical receiver means and said optical transmitter means.

4. A hybrid fiber optic transceiver comprising:
   a. optical receiver means for receiving optical data signals from an optical data bus, said optical receiver means including a silicon photo-responsive diode, the electrical output of which is connected to an input of a trans-impedance type preamplifier, the bandwidth of said preamplifier being of a value which is in a range of from 70% to 80% of the bit rate of said optical data signals,
      a first amplifier having an input connected to an output of said preamplifier,
      a second amplifier,
      circuit means connecting an output of said first amplifier to an input of said second amplifier, said circuit means acting to clamp the signal amplitude of said first amplifier output and coupling said first amplifier output to said second amplifier input with a short time constant, of sufficiently short duration as to allow said optical receiver means to be capable of responding to said optical data signals within a minimum number of preamble bits,
      comparator means for producing digital logic signals from the output of said second amplifier which correspond, respectively, to the data levels received over said optical data bus,
      output of comparator coupled to frequency doubler means for producing pulses at each edge of said digital logical signal
      output of comparator coupled to clock generator and timing circuit means for producing a continuous clock signal responsive to said pulses from said frequency doubler means and for timing the appearance of said digital logic signals at said terminal output means and
      output terminal means for said digital logic signals and
   b. transmitter means including input terminal means for receiving electrical data signals from an external source and for producing corresponding optical data output signals to be communicated via said optical data bus.

5. The hybrid fiber optic transceiver described in claim 4 further comprising an enclosure means for fully enclosing said optical transmitter means and said optical receiver means.

* * * * *